United States Patent
Nelson et al.

(10) Patent No.: US 9,834,248 B2
(45) Date of Patent: Dec. 5, 2017

(54) VEHICLE GUIDANCE SYSTEM WITH A STEPPER MOTOR

(71) Applicant: Deere & Company, Moline, IL (US)

(72) Inventors: Frederick W. Nelson, Waukee, IA (US); Terence D. Pickett, Waukee, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/997,251

(22) Filed: Jan. 15, 2016

(65) Prior Publication Data

US 2017/0203787 A1   Jul. 20, 2017

(51) Int. Cl.
| | |
|---|---|
| *B62D 5/06* | (2006.01) |
| *B62D 6/00* | (2006.01) |
| *G05D 1/00* | (2006.01) |
| *G05D 1/02* | (2006.01) |
| *H04L 29/08* | (2006.01) |
| *B62D 5/04* | (2006.01) |
| *B62D 5/12* | (2006.01) |
| *G01C 21/26* | (2006.01) |
| *B60W 50/00* | (2006.01) |

(52) U.S. Cl.
CPC ............... *B62D 6/00* (2013.01); *B62D 5/046* (2013.01); *B62D 5/12* (2013.01); *G05D 1/0088* (2013.01); *G05D 1/0212* (2013.01); *H04L 67/12* (2013.01); *B60W 2050/007* (2013.01)

(58) Field of Classification Search
CPC ... B62D 6/00; B62D 5/06; B62D 5/12; G05D 1/0212; G05D 1/0088; H04L 67/12; B60W 2050/007; G01C 21/26

USPC ....... 701/23, 41, 50, 408; 180/169, 401, 402
See application file for complete search history.

(56) References Cited

U.S. PATENT DOCUMENTS

| | | | |
|---|---|---|---|
| 5,234,070 A | * | 8/1993 | Noah .................. A01B 69/008 180/169 |
| 6,250,421 B1 | | 6/2001 | Poshadlo |
| 6,323,763 B1 | | 11/2001 | Bohner et al. |

(Continued)

FOREIGN PATENT DOCUMENTS

| | | |
|---|---|---|
| CN | 203612045 U | 5/2014 |
| CN | 205615575 U | 10/2016 |
| FR | 2865988 A1 | 8/2005 |

OTHER PUBLICATIONS

Search Report issued in counterpart application No. GB1621395.1, dated Jun. 16, 2017 (3 pages).

*Primary Examiner* — Tan Q Nguyen

(57) ABSTRACT

A vehicle guidance system comprises a hydraulic steering cylinder for controlling a steering angle of a steerable wheel of a vehicle. A hydraulic steering valve is adapted to control a flow of hydraulic fluid to the hydraulic steering cylinder. A stepper motor is adapted to move or modulate a shaft coupled to the hydraulic steering valve in accordance with a control signal or control data message from a vehicle guidance controller. A position encoder of the stepper motor can measure the movement of the shaft. A steering angle estimator can estimate the steering angle based on measurements of the position encoder. A location-determining receiver provides position data and heading data. A vehicle guidance controller provides the control signal or control data message based on the estimated steering angle, position data and heading data.

8 Claims, 4 Drawing Sheets

(56) References Cited

U.S. PATENT DOCUMENTS

| | | | |
|---|---|---|---|
| 6,581,717 B1* | 6/2003 | S.o slashed.rensen | B62D 5/09 180/401 |
| 7,188,015 B2* | 3/2007 | Lange | B62D 5/04 172/2 |
| 8,645,016 B2 | 2/2014 | Durkos et al. | |
| 8,781,685 B2* | 7/2014 | McClure | B62D 5/046 342/357.52 |
| 8,892,308 B2* | 11/2014 | Davis | B62D 1/28 701/41 |
| 9,101,090 B2 | 8/2015 | Pierce et al. | |
| 2004/0206570 A1* | 10/2004 | Tajima | B62D 6/002 180/402 |
| 2005/0258384 A1 | 11/2005 | Leutner | |
| 2014/0343782 A1 | 11/2014 | Nelson et al. | |

* cited by examiner

VEHICLE GUIDANCE SYSTEM WITH A STEPPER MOTOR

FIELD

This disclosure relates to a vehicle guidance system with a stepper motor.

BACKGROUND

In certain prior art, an off-road vehicle can use a wheel angle sensor on or near one or more steered wheels to detect the heading angle or yaw angle of the steered wheel. Sometimes, the wheel angle sensor can require calibration or adjustment for the steering geometry or configuration of a particular vehicle upon which it is mounted. Other times, the wheel angle sensor needs special mounting adaptors, mounting brackets, or customized hardware provisions to work on a complete line of off-road vehicle models that are available from a manufacturer. Accordingly, there is need to avoid manufacturing and engineering costs associated with the calibration or customization of wheel angle sensors for different off-road vehicles.

SUMMARY

In accordance with one embodiment, a system for guiding a vehicle comprises a hydraulic steering cylinder for controlling a steering angle of a steerable wheel of a vehicle. A hydraulic steering valve is adapted to control a flow of hydraulic fluid to the hydraulic steering cylinder. A stepper motor is adapted to move or modulate a shaft coupled to the hydraulic steering valve in accordance with a control signal or control data message from a vehicle guidance controller (e.g., in an automatic guidance mode). A position encoder is associated with the stepper motor to measure the movement of the motor shaft. A steering angle estimator can estimate the steering angle based on measurements of the position encoder (e.g., which can obviate or render redundant the need for a wheel angle sensor). A location-determining receiver provides position data or heading data for the vehicle, wherein the vehicle guidance controller provides the control signal or control data message based on the estimated steering angle, the position data, and the heading data.

BRIEF DESCRIPTION OF THE DRAWINGS

Like reference numbers in different drawings indicate like elements in the drawings.

DETAILED DESCRIPTION

As used in this document, a module or estimator may refer to software, hardware, or both. If a module is realized as software, it may be stored in a data storage device for processing by a data processor. Adapted to, configured to, or arranged to means that a module, estimator, or other device is capable of performing a function described in the specification or supporting a feature. For example, adapted to, configured to or arranged to may include a module that is programmed with software instructions that are stored in a data storage device for processing by a data processor to perform specific functions set forth in this document.

Figure 1:
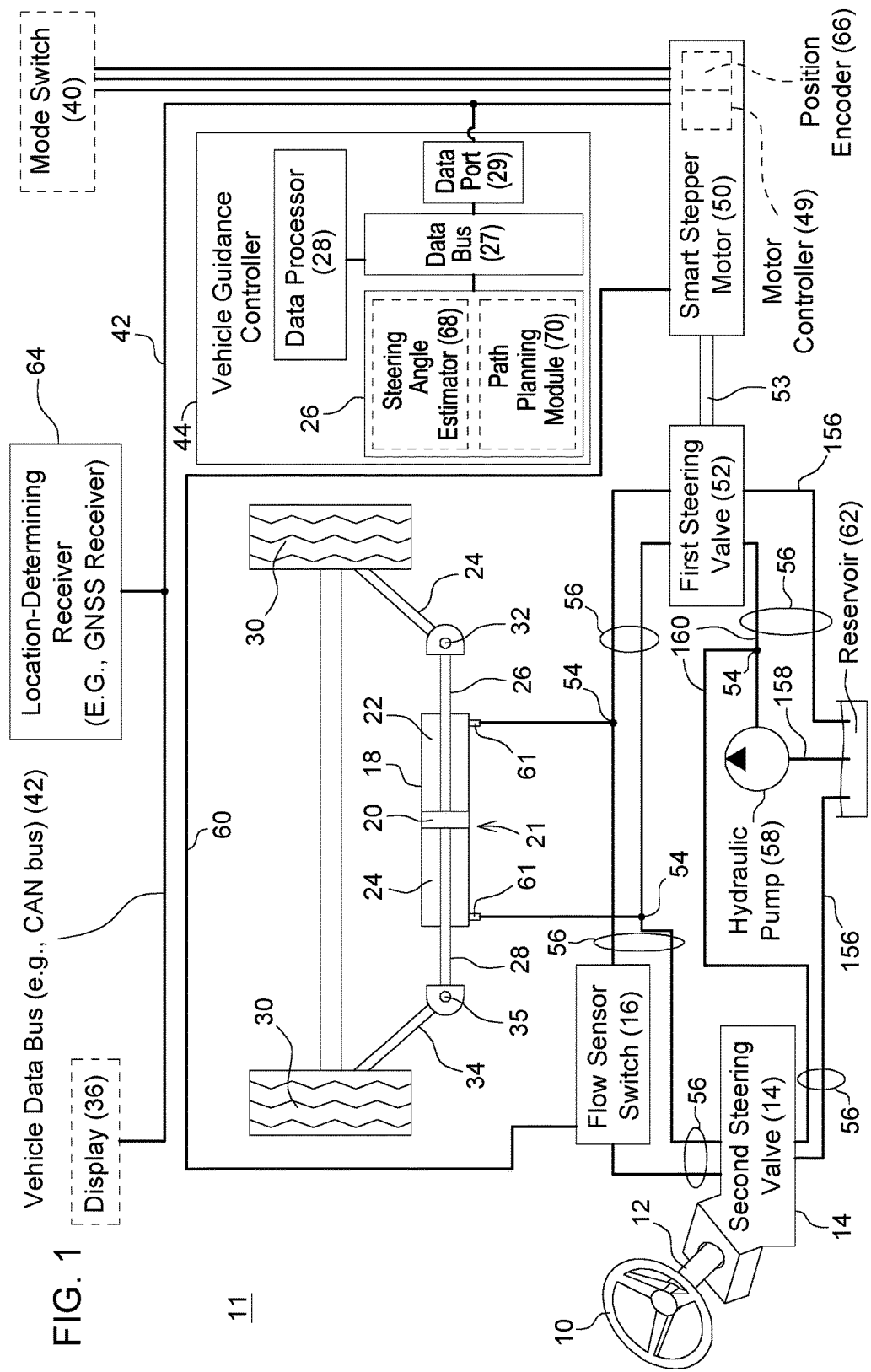
FIG. 1 is a block diagram of one embodiment of a vehicle guidance system with a stepper motor.

In accordance with one embodiment of FIG. 1, a system 11 for guiding a vehicle comprises a hydraulic steering cylinder 21 for controlling a steering angle of a steerable wheel 30 of a vehicle. A first hydraulic steering valve 52 is adapted to control hydraulic parameters (e.g., a flow) of hydraulic fluid to the hydraulic steering cylinder 21 via one or more hydraulic lines 56. A stepper motor 50 (e.g., smart stepper motor) is adapted to move or modulate a motor shaft 53 coupled to the first hydraulic steering valve 52 in accordance with a control signal or control data message from a vehicle guidance controller 44 (e.g., in an automatic guidance mode). A position encoder 66 is associated with the stepper motor 50 to measure the movement, rotation (e.g., angular rotation, relative angular position, absolute angular position or step angle) or displacement of the motor shaft 53. A steering angle estimator 68 or data processor 28 can estimate the steering angle of the wheel 30 based on measurements of the position encoder 66 (e.g., a sensor device or a sensorless estimator from an indexing command or stepper control signal of the motor controller 49 to the stepper motor 50). A location-determining receiver 64 provides position data or heading data for the vehicle, where the vehicle guidance controller 44 provides a control signal or control data message based on the estimated steering angle, the position data, and the heading data. Hydraulic lines 56 interconnect the hydraulic devices by one or more hydraulic lines 56 and tee joints 54 or other hydraulic coupling devices.

Hydraulic Steering Cylinder

In one embodiment, a hydraulic steering cylinder 21 for controlling a steering angle of a steerable wheel 30 of a vehicle comprises a dual-shaft hydraulic steering cylinder 21, where a dual piston 20 within a generally cylindrical housing 18 can be moved linearly in way that increases a first volume or first pressure of hydraulic fluid in a first chamber 22 while it decreases a second volume or second pressure of a second chamber 24, or vice versa. Each chamber is associated with separate hydraulic ports 61 (e.g., input/output ports) and corresponding hydraulic lines 56.

Although FIG. 1 shows a hydraulic steering cylinder 21 with a dual piston or double-sided piston 20 connected to a shaft (e.g., 26 or 28) on each side, in alternate embodiments the hydraulic steering cylinder 21 may be replaced by one or more individual hydraulic cylinders with a single piston.

As illustrated in FIG. 1, a first output shaft 26 of the hydraulic steering cylinder 21 is associated with a first joint 32 (e.g., tie-rod end). In turn, the first joint 32 is connected to a first arm 24 for turning or moving a steerable wheel 30, or its hub, about a generally vertical axis, where the first joint 32 facilitates a variable angle between the first output shaft 26 and the first arm 24 to support steering or turning of the steerable wheel 30, or its hub. Meanwhile, the second output shaft 28 of the hydraulic steering cylinder 21 is associated with a second joint 35 (e.g., tie-rod end). In turn, the second joint 35 is connected to a second arm 34 for turning or moving another steerable wheel 30, or its hub, about a generally vertical axis, where the second joint 35 facilitates a variable angle between the second output shaft 28 and the second arm 34 to support steering or turning of the steerable wheel 30, or its hub. Hydraulic ports 61 of the hydraulic steering cylinder 21 are coupled to the first hydraulic steering valve 52 via one or more hydraulic lines 56.

As illustrated in FIG. 1, the hydraulic steering cylinder 21 can be controlled by a first hydraulic steering valve 52 in an automatic steering mode (e.g., by an AUTOTRAC® steering system, which is registered trademark of Deere & Company), or a second steering mode in a manual mode (e.g., user-operator steering mode). In the automatic steering mode, the vehicle guidance controller 44 (or control module 151 in FIG. 2 controls the steering, such as heading angle or yaw angle, and rate of change of the heading angle or yaw angle for each time interval based on location data from the location-determining receiver 64 and a path plan for the vehicle. In the manual steering mode, the operator can control the steering, such as the heading angle or yaw angle, based on visual observations of the operator in the cab or cockpit of the vehicle, or based on visual guidance indicators provided on a display 36. Even in the manual steering mode, the location-determining receiver 64 may provide visual guidance indicators, such as an electronic light bar guidance for the vehicle operator to follow by turning or adjusting the steering wheel 10 from time to time.

First Hydraulic Steering Valve

In one embodiment, the first hydraulic steering valve 52 is arranged or adapted to control one or more hydraulic parameters, such as the flow, the direction of flow, the flow rate, change in flow rate, the volume, and/or the pressure, of hydraulic fluid to the hydraulic steering cylinder 21, or to one or more ports 61 of the hydraulic steering cylinder 21. As shown, the hydraulic steering cylinder 21 has multiple ports 61 (e.g., two ports) and requires asymmetric or differential hydraulic parameters (e.g., differential hydraulic flow or differential hydraulic pressure) between the multiple ports 61 to provide a uniform steering response of the steering over the range of turning motion of the steerable wheel 30 or wheels 30.

In one embodiment, the first hydraulic steering valve 52 comprises a shaft that is rotatable to control variably the flow rate between an input port and output port of the valve 52. For example, as the shaft of the first hydraulic steering valve 52 is rotated, the hydraulic parameters of the hydraulic fluid can be controlled in accordance with one or more of the following: (1) the direction of flow of fluid to or from the input port, or to or from the output port, can be changed or reversed, (2) the rate or change in rate of flow between the input port and the output port of the valve, can be adjusted (e.g., increased or decreased by adjustment of an orifice or set of channels connecting the input and output port), (3) the volume of pumped fluid (supplied by the hydraulic pump 58) from the input port or the output port can be adjusted, or (4) the pressure level or suction level of the fluid leaving or entering the port can be adjusted.

In an alternate embodiment, the first hydraulic steering valve 52 comprises a spool valve that provides an open state and a closed state. In another alternate embodiment, the first hydraulic steering valve 52 comprises a spool valve that comprises an open states in opposite flow directions and a closed state.

Hydraulic Pump

In one embodiment, the hydraulic pump 58 comprises a gear pump, such as an internal gear pump, an external gear pump, or a georotor gear pump. The hydraulic pump 58 may provide positive displacement flow of hydraulic fluid, which means a fixed volume or rate of fluid for each revolution of the rotor within the pump 58. The hydraulic pump 58 provides hydraulic fluid to the first hydraulic steering valve 52, the second hydraulic steering valve 14, or both via one or more hydraulic lines 160. The hydraulic pump 58 can draw or intake hydraulic fluid from the reservoir 62 via intake line 158 and exhaust, discharge or pump the fluid to the hydraulic steering valves (56, 14) via hydraulic lines 160. The steering valves (56, 14) have return hydraulic lines 156 to provide, recirculate, recycle or replenish the hydraulic fluid in the reservoir 62.

In an alternate embodiment, the hydraulic pump 58 and first hydraulic steering valve 52 may be combined as a gear pump (e.g., georotor pump) that is driven by an electric motor and that can control or regulate hydraulic parameters, such as the flow, the flow rate and the pressure of the hydraulic fluid provided to the hydraulic steering cylinder 21.

Location-Determining Receiver

In one embodiment, the location-determining receiver 64 comprises a satellite navigation receiver, such as a global navigation satellite receiver (GNSS) receiver with differential correction or Global Positioning System (GPS) or Global Navigation Satellite System (GLONASS) with differential correction. The differential correction signal may be provided by a separate or integral satellite receiver, satellite transceiver, or another wireless communications device from a commercially available correction signal provider, such as STARFIRE™ service network correction signal available through Deere & Company of Moline, Ill., U.S.A.

In one embodiment, the location-determining receiver 64 is adapted to provide current position data or heading data for the vehicle, wherein the vehicle guidance controller 44 provides a control signal or control data message based on the estimated steering angle, the position data, and the heading data (e.g., and a path plan for the vehicle, such as an A-B line, generally linear, row tracking, contour, spiral, or other path plan).

Vehicle Guidance Controller

In one embodiment, the vehicle guidance controller 44 comprises a data processor 28, a data storage device 26, and one or more data ports 29 that are coupled to a data bus 27 to allow communication of data between the data processor 28 and the data storage device 26. The data processor 28 may comprise a microcontroller, a microprocessor, a programmable logic array, an application specific integrated circuit (ASIC), a digital signal processor, or another device for processing data, manipulating, accessing, retrieving, and storing data. A data storage device 26 may comprise electronic member, non-volatile electronic memory, an optical storage device, a magnetic storage device, or another device for storing digital or analog data on a tangible storage medium, such as an optical disk, a magnetic disk, or electronic memory. The data port 29 may comprise a buffer memory, a transceiver or both for interfacing with a vehicle data bus 42 (e.g., Controller Area Network (CAN) data bus 27).

In one embodiment, the vehicle guidance controller 44 further comprises a steering angle estimator 68 and a path planning module 70. For example, the steering angle estimator 68 and the path planning module 70 can be stored in the data storage device 26 for execution or processing by the data processor 28. A steering angle estimator 68 is adapted to estimate the steering angle (e.g., and rate of change or steering angle or yaw angle) of one or more wheels 30 (or their respective hubs) based on measurements of the position encoder 66. For example, the steering angle estimator 68 (e.g., angular translator or transformation module) comprises a look-up table, chart, database, file, set of data records, graphical relationship, one or more equations, one or more quadratic equations or linear functions that define the relationship between a sensed, commanded or observed angle of the motor shaft 53 of the stepper motor (50, 150) and the corresponding steering angle of the wheel or wheels 30 of the vehicle in the automatic guidance mode.

In one configuration, a path planning module 70 establishes a path plan or route based on operator input or stored geographic coordinates, reference coordinates, or way points from the location-determining receiver 64. For example, the path planning module 70 may use location data from a location-determining receiver 64 to estimate a boundary or perimeter of a field or work area. Further, the path planning module 70 may automatically select or may allow an operator to select a path plan that is consistent with: (1) a path that navigates between two or more geographic coordinates or way points, (2) a path that covers or completely covers an area of the work area or field with minimal overlap of rows or swaths, such as an A-B line, generally linear, row tracking, contour, spiral, or other path plan.

As illustrated in FIG. 1, the vehicle guidance controller 44 is coupled to a motor controller 49 of the stepper motor 50 or the stepper motor 50 via a vehicle data bus 42 to support communication of the control signal or control data message between the vehicle guidance controller 44 and the stepper motor 50. However, in FIG. 2 the vehicle controller 44 is directly coupled to the motor controller 49 of the stepper motor 150 or the stepper motor 150 via a dedicated communications line, transmission line, or cable.

Display 36

In certain embodiments, an optional display 36 may be coupled to the vehicle data bus 42 or directly to the vehicle guidance controller 44. The optional display 36 may be deleted from some embodiments as indicated by the dashed lines in FIG. 1. The display 36 may comprise a user interface for a user to enter input data, to receiver output data, or both from the vehicle guidance controller 44, or the smart stepper motor (50 or 150). The display 36 may comprise a touchscreen display or a display in combination with a keypad, keyboard or pointing device for entering data into or outputting data from the vehicle guidance controller 44.

Stepper Motor

In one embodiment, the stepper motor 50 (e.g., smart stepper motor) is adapted to move or modulate a motor shaft 53 (e.g., rotational movement or linear movement) coupled to the first hydraulic steering valve 52 in accordance with a control signal or control data message from the vehicle guidance controller 44. Further, as illustrated in FIG. 1, the stepper motor 50 may comprise a motor controller 49 for controlling the rotation or movement of the motor shaft 53 of the stepper motor 50. The motor controller 49 of the smart stepper motor 50 is indicated as optional in dashed lines and may be replaced by a separate motor controller 49 or controller external to or separate from the smart stepper motor 50.

Position Encoder

In one embodiment, a position encoder 66 associated with the stepper motor 50 is arranged to measure the movement, rotation or displacement of the motor shaft 53. The position encoder 66 may be carried out by various illustrative examples or alternatives as follows.

In a first example, the position encoder 66 comprises a shaft position sensor of the motor shaft 53 of the stepper motor 50. In one example, the shaft position sensor may comprise an optical sensing device that senses a change in the position of one or more optical markings on the motor shaft 53 of the stepper motor 50, or that counts a number of optical markings on the shaft 53 or a rotor of the stepper motor 50.

In a second example, the shaft position sensor may comprise a magnetic sensing device that senses the change in the position of a permanent magnet mounted on the motor shaft 53 of the stepper motor 50 or a rotor of the motor 50. The magnetic sensing device may comprise a magnetic field sensor (e.g., Hall Effect sensor), a magneto-resistive sensor or another sensor that can measure degrees of rotation of the shaft of the stepper motor 50.

In a third example, the position encoder 66 comprises a measurement device (e.g., monitoring of an indexing control circuit or input to a driver stage for controlling the stepper motor 50) for detecting a sequence of one or more signal pulses (e.g., polarity of signal pulses, duration of the signal pulses, and relative timing and order of signal pulses of different phases) applied to one or more phase windings or stator windings of the stepper motor 50 during respective time intervals to estimate a rotational position of the shaft 53.

In one embodiment, the position encoder 66 eliminates the need for a wheel angle sensor associated with the steerable wheel 30 or a mechanical steering system mechanically coupled to the hydraulic steering cylinder 21.

The position encoder 66 is indicated in dashed lines because in certain embodiments the position encoder 66 can be deleted and replaced by the motor controller 49, such as where the indexing module of the motor controller 49 may comprise the position encoder (e.g., 66) or perform similar or analogous functionality. In other embodiments, the estimated position or rotation of the motor shaft 53 of the indexing module of the motor controller 49 may be checked or verified against sensor measurements (e.g., magnetic field or optical sensor) of the position encoder 66 where a redundant position encoder 66 is used in conjunction with the indexing module to estimate position or rotation of the motor shaft 53 of the stepper motor (50 or 150).

Second Hydraulic Steering Valve

As illustrated in FIG. 1, in a manual mode a second hydraulic steering valve 14 is operable by a vehicle operator via a steering wheel 10 that rotates a steering shaft 12 or a rotational sensor thereon. The second hydraulic steering valve 14 may comprise an electrohydraulic steering valve that receives an electrical signal from a steering wheel rotational sensor or a steering valve that receives a mechanical rotation via the steering shaft 12 to control hydraulic fluid provided to the hydraulic steering cylinder 21, or one or more chambers (22, 24) or ports 61 of the hydraulic steering cylinder 21.

In an alternate embodiment, the second hydraulic steering valve 14 may comprise a mechanical hydraulic steering valve that is manually opened, closed or changed by rotational movement or twisting of the operator of the steering wheel 10, or its shaft 12, or a linkage associated with either.

Flow Sensor Switch

A flow sensor switch 16 is coupled hydraulically to the second hydraulic steering valve 14 to detect operator control of the steering wheel 10 by a change in sensed flow or flow rate of the hydraulic fluid from the second hydraulic steering value 14. The vehicle guidance controller 44 or enhanced stepper motor 50 (e.g., smart stepper motor) disables the automatic steering mode, the automated steering or automatic control of the first hydraulic steering valve 52, based on the position data and heading data, if the flow sensor switch 16 provides a signal or data message indicative of operator control or manual control of the second hydraulic steering valve 14. The flow sensor switch 16 may provide a signal to the stepper motor 50 or motor controller 49 of the stepper motor 50 via a communications line (as illustrated) or via the vehicle data bus 42 with appropriate communications interface (e.g., CAN bus transceiver) to the vehicle data bus 42.

Stepper Motor

In one embodiment, the stepper motor 50 comprises a brushless direct current electric stepping motor or a switched reluctance stepping motor that can rotate to a desired step or angular shaft position of the motor shaft 53. The stepper motor 50 may have a motor controller 49 or an indexing controller that provides a proper signal, such as a pulse train to one or more stator windings with appropriate timing to incrementally rotate or step the rotor shaft by a known angular rotational angle or to a known angular position.

Mode Switch

In one embodiment, a mode switch 40 is capable of changing from an manual steering mode in which an operator can steer the vehicle, or a steerable wheel 30, via the steering wheel 10 or an automatic guidance mode in which the vehicle guidance controller 44 steers a steerable wheel 30 of the vehicle based on position data, heading data and the estimated steering angle.

In another embodiment, a steering angle estimator 68 (e.g., angle translator) is configured to estimate the steering angle and rate of change of the steering angle of the steerable wheel from observed or sensed shaft rotation data from the position encoder 66 or the motor controller 49; each vehicle guidance controller 44 can provide a control signal or control data message based on the estimated steering angle, the rate of change of the steering angle, and the position data and the heading data.

Figure 2:
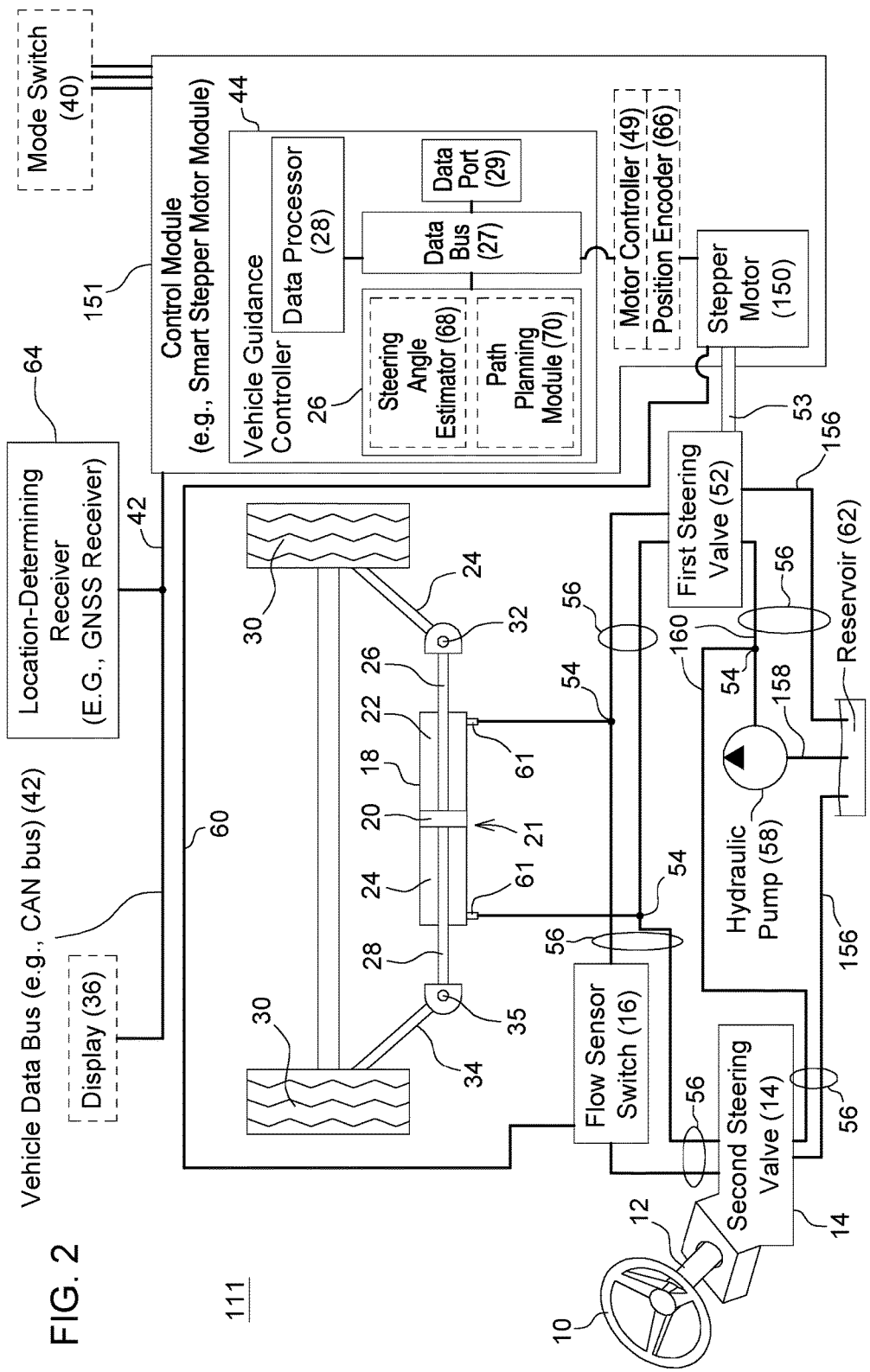
FIG. 2 is a block diagram of another embodiment of a vehicle guidance system with a stepper motor.

The embodiment of system 111 of FIG. 2 is similar to the embodiment of FIG. 1, except the embodiment of system 111 replaces the combination of a separate stepper motor 50 (e.g., which can include motor controller 49 and position encoder 66) and a vehicle guidance controller 44 with an enhanced stepper motor or control module 151 (e.g., smart stepper motor module) that comprises a vehicle guidance controller 44 (e.g. integral vehicle guidance controller 44), stepper motor 150, motor controller 49 and position encoder 66. The motor controller 49 and the position encoder 66 may be used separately, together, or deleted (in favor of the controller 44) in certain embodiments, as indicated by the dashed lines.

Figure 3:
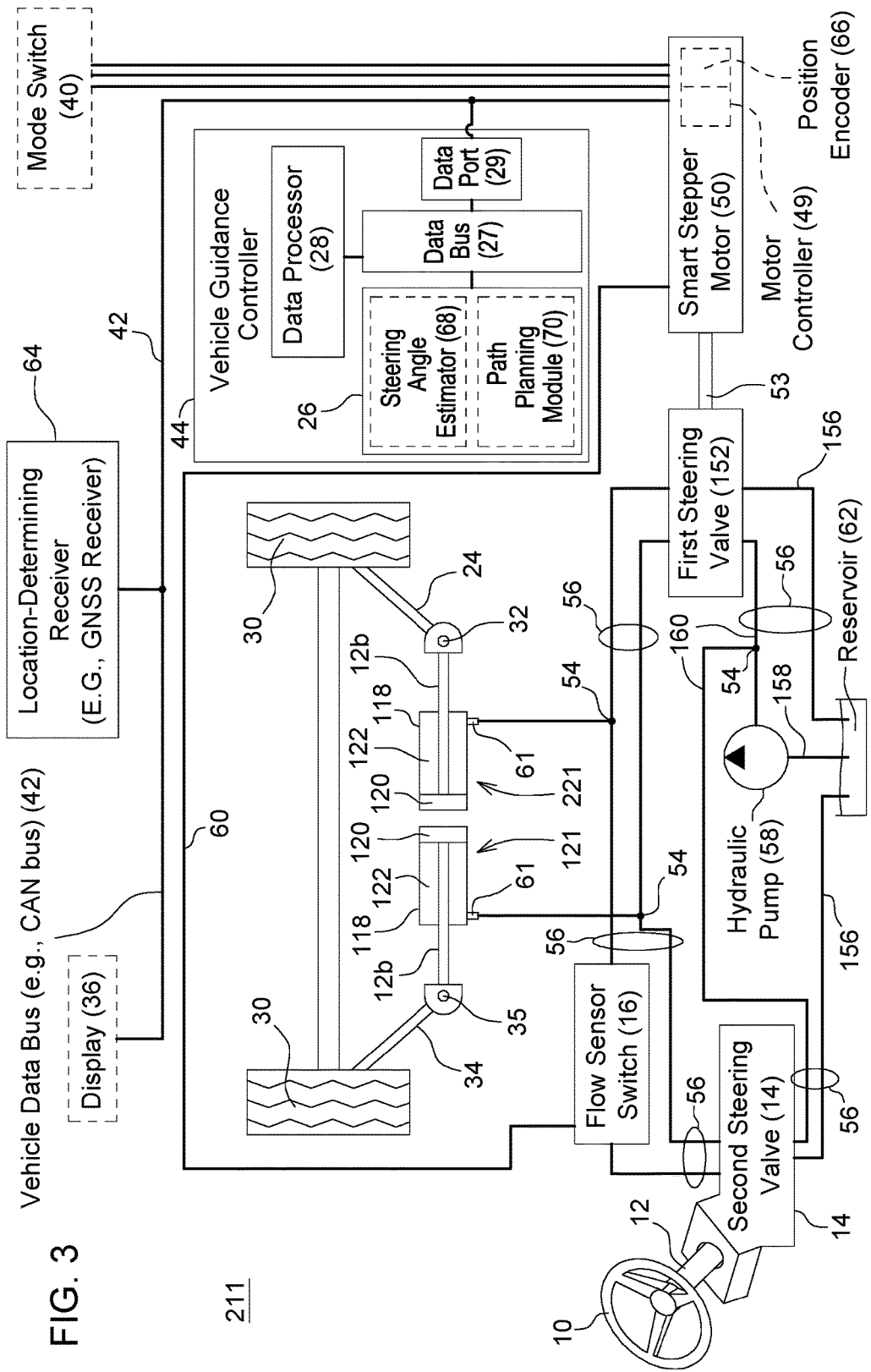
FIG. 3 is a block diagram of yet another embodiment of a vehicle guidance system with a stepper motor.

The embodiment of system 211 of FIG. 3 is similar to the embodiment of FIG. 1, except the embodiment of system 211 has a different hydraulic steering cylinder than the hydraulic steering cylinder 21. In an alternate embodiment, as illustrated in FIG. 3, the hydraulic steering cylinder 21 may comprise one or more hydraulic cylinders (121, 221), where each hydraulic cylinder (121, 221) has a piston 120 within a generally cylindrical housing 118 that compresses or manipulates hydraulic fluid in a single chamber 122 and has at least one port 61 for intake of hydraulic fluid, exhaust of hydraulic fluid, or both in communication with the chamber 122. For example, the dual-shaft hydraulic steering cylinder 21 can be replaced by two hydraulic steering cylinders (121, 221), each with one output shaft 126 and a chamber 122 associated with steering or turning a corresponding steerable wheel 30 (e.g., in unison with another steerable wheel 30 of the vehicle). In practice, the hydraulic cylinders (121, 221) may be matched or paired for substantially similar or the same movement of the shaft, or its piston, in response to the input parameters, such as flow, flow rate and pressure, of hydraulic fluid.

In an alternate embodiment (not shown), if a single hydraulic steering cylinder 21 is used for steering a ganged linkage may be used to tie steering of the two front wheels 30 of the vehicle together, for example.

Figure 4:
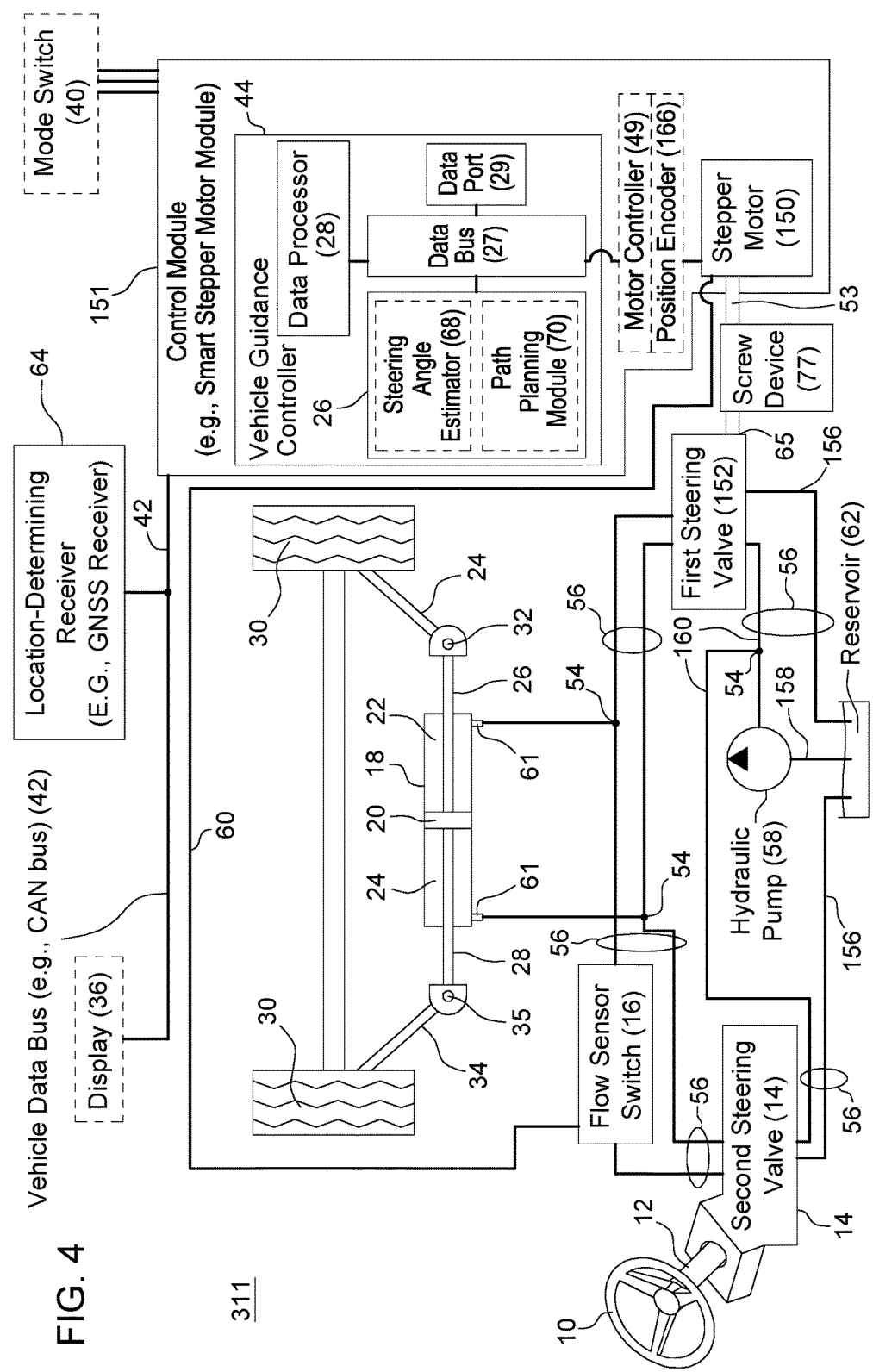
FIG. 4 is a block diagram of still another embodiment of a vehicle guidance system with a stepper motor.

The embodiment of system 311 of FIG. 4 is similar to the embodiment of FIG. 1, except that a screw device 77 is placed between the stepper motor 50 and the first hydraulic steering valve 52 and the first hydraulic steering valve 52 may comprise a spool valve that has a linear displacement of the valve shaft 65 to control the flow rate, or off states, on states or direction of flow of the hydraulic fluid. As shown in FIG. 4, the motor shaft 53 of the stepper motor 50 is coupled to a screw device 77 to change rotational movement of the stepper shaft 53 to a linear movement for control of the first hydraulic steering valve 152 (e.g., spool valve). In practice, the position encoder 166 can be calibrated with a look-up table or another compensator to account for one or more of the following error sources: (1) any conversion error (e.g., gear inefficiency or variability) associated with conversion from rotational to linear motion by the screw device 77, and (2) any valve error associated in the first hydraulic steering valve 152 with respect to the linear motion versus the (expected) hydraulic response at one or more ports of the first hydraulic steering valve 152.

Instead of the above compensator for the position encoder 166, an alternate embodiment of FIG. 4 may incorporate wheel angle sensors (not shown) to measure or detect the turning or rotation of the steerable wheel 30 about a generally vertical axis with respect to ground. For example, wheel angle sensors could be located to measure the angle between the first arm 24 and the shaft 26 or the second arm 34 and shaft 28.

In another configuration, the stepper motor 50 may comprises a linear actuator without the screw device 77 that is directly coupled to the first hydraulic steering valve 52 to move linearly the first hydraulic steering valve 52. As illustrated in the embodiments of FIG. 1 through FIG. 3, the stepper motor 50 may have a rotatable shaft that controls a rotatable hydraulic steering valve as explained previously.

Some embodiments of the system are well suited for eliminating the need for a steerable wheel, angle sensor. Instead, certain embodiments of the system can use a position encoder 66 for determining the steering position, or even the angular indexing data provided by the stepper motor 50, its motor controller 49, or its indexer. Therefore, the system facilitates simple and efficient retrofit installation due to less parts and bracket/wiring complexity. The system can be used with to upgrade vehicles in the field with electrohydraulic valve controllers, for example.

If the steering valve (e.g., 52, 152) comprises other than a spool valve, an electrohydraulic spool valve or a servo spool valve, no deadband calibration required for this valve and system. In contrast, all or most spool valves (including servo valves) require deadband calibration for accurate closed loop performance.

Because a rotational valve is used in certain embodiments, the system promotes higher resistance to debris causing valve sticking due to the need to actively rotate valve to produce flow.

Having described the preferred embodiment, it will become apparent that various modifications can be made without departing from the scope of the invention as defined in the accompanying claims.

The following is claimed:

1. A system for guiding a vehicle, the system comprising:
A hydraulic steering cylinder for controlling a steering angle of a steerable wheel of a vehicle;

a first hydraulic steering valve for controlling a flow of hydraulic fluid to the hydraulic steering cylinder in an automatic guidance mode of the vehicle;

a vehicle guidance controller for supporting the automatic guidance mode;

a stepper motor that is adapted to move or modulate a shaft coupled to the hydraulic steering valve in accordance with a control signal or control data message from the vehicle guidance controller;

a position encoder associated with the stepper motor to measure the movement, rotation or displacement of the shaft;

a steering angle estimator for estimating the steering angle based on measurements of the position encoder;

a location-determining receiver for providing position data or heading data for the vehicle, wherein the vehicle guidance controller provides a control signal or control data message based on the estimated steering angle, the position data, and the heading data; a second hydraulic steering valve operable by a vehicle operator via a steering wheel;

a flow sensor switch coupled hydraulically to the second hydraulic steering valve to detect operator control of the steering wheel by a change in sensed flow or flow rate of the hydraulic fluid from the second hydraulic steering value; and the controller disabling automatic steering or automatic control of the first hydraulic steering valve, based on the position data and heading data, if the flow sensor switch provides a signal or data message indicative of operator control of the first hydraulic steering valve in a manual mode.

2. The system according to claim 1 wherein the vehicle guidance controller is coupled to the stepper motor via a vehicle data bus to support communication of the control signal or control data message between the vehicle guidance controller and the stepper motor.

3. The system according to claim 1 wherein the position encoder comprises a shaft position sensor of the stepper motor.

4. The system according to claim 1 wherein the position encoder comprises a measurement device for detecting a sequence of one or more signal pulses applied to one or more phase windings or stator windings of the stepper motor during respective time intervals to estimate a rotational position of the shaft.

5. The system according to claim 1 wherein the position encoder eliminates the need for a wheel angle sensor associated with the steerable wheel or a mechanical steering system mechanically coupled to the hydraulic steering cylinder.

6. The system according to claim 1 wherein the stepper motor comprises a brushless direct current electric stepping motor or a switched reluctance stepping motor that can rotate to a desired step or angular shaft position.

7. The system according to claim 1 further comprising a mode switch to change from an manual steering mode in which an operator can steer the vehicle via the steering wheel or the automated guidance mode in which the vehicle guidance controller steers a steerable wheel of the vehicle based on position data, heading data and the estimated steering angle.

8. The system according to claim 1 wherein:
the steering angle estimator is configured to estimate the steering angle and rate of change of the steering angle, and wherein the vehicle guidance controller provides a control signal or control data message based on the estimated steering angle, the rate of change of the steering angle, and the position data and the heading data.

* * * * *